United States Patent [19]

Pardikes

[11] Patent Number: 5,599,101
[45] Date of Patent: Feb. 4, 1997

[54] DRY POLYMER PROCESSING SYSTEM

[76] Inventor: Dennis G. Pardikes, 12811 S. 82nd. St., Palos Park, Ill. 60464

[21] Appl. No.: 522,842

[22] Filed: Sep. 1, 1995

[51] Int. Cl.⁶ ................................................. B01F 15/02
[52] U.S. Cl. ..................... 366/165.1; 366/178.1
[58] Field of Search .................. 366/165.1, 165.2, 366/165.3, 165.4, 165.5, 166.1, 155.1, 155.2, 178.1

[56]  References Cited

U.S. PATENT DOCUMENTS

| | | | |
|---|---|---|---|
| 3,840,213 | 10/1974 | Kormos | 366/155.1 |
| 4,175,873 | 11/1979 | Iwako | 366/165.3 |
| 4,184,771 | 1/1980 | Day | 366/165.4 |
| 4,778,280 | 10/1988 | Brazelton | 366/165.4 |
| 5,344,233 | 9/1994 | Barger | 366/165.3 |

OTHER PUBLICATIONS

Grundfos Sales Piece entitled "You Can't Buy a Better Sump Pump" Mar. 1991.

A drawing (Fig. 6) entitled "The DP Series Design and Operation" showing a pulley and belt drive; taken from an unknown source (no date).

*Primary Examiner*—Robert W. Jenkins
*Attorney, Agent, or Firm*—Laff, Whitesel, Conte & Saret, Ltd.

[57]  ABSTRACT

A low cost dry polymer processing system has an inverted submersible pump with a weir mounted on top of the pump housing and over an impeller in the housing. The weir is a combination of a sleeve and a coaxial funnel with a top edge of the funnel that is level with respect to gravity. An electrolyte liquid rising in the sleeve overflows the top edge of the funnel in order to form a liquid curtain uniformly covering the inside wall of the funnel. The amount of liquid is limited so that the impeller is not hydraulically locked. Dry polymer is dropped through the funnel and into the eye of the impeller. Thereafter, the remainder of the polymer processing is carried out by any suitable means.

15 Claims, 4 Drawing Sheets

DRY POLYMER PROCESSING SYSTEM

This invention relates to dry polymer processing systems and more particularly to low cost, low volume systems for processing dry, dense polymer.

For convenience of expression, the terms "water" or "liquid" are used hereinafter to describe all suitable electrolytes that may be used to process dry polymer. The terms "water" or "liquid" should be construed broadly enough to include any liquid suitable for wetting dry polymer.

A characteristic of dry polymer is that it is very coarse and difficult to properly wet. The mixture of water and polymer forms an abrasive material which tends to grind away at bearings, seals, and the like. Therefore, if conventional polymer hydrating or activating techniques are used, there is a mechanical action almost like trying to stir sand with an impeller. This action leads to great problems such as erosion or a build-up of debris on shaft seals, damage to associated equipment, and the like.

Since the conventional way of mounting an impeller is to put it on the shaft of a motor, and further, since the impeller is operated in a horizontal position, the motor is generally directly below the impeller. As the abrasive material erodes and eats its way through the metal and seals, the motor is attacked by the abrasive water and polymer dripping from the impeller shaft seal. As a result, prior art machines have failed after only a few months in the field.

This problem of early motor failure has led to machines which place the motor at a location remote from the impeller with a pulley and belt system for applying the torque from the motor to turn the impeller. While this physical isolation did help the motor wear problems, it only transferred the wear problems from the motor to the pulley and belt system, with an unusually high maintenance cost required for a more frequent replacement of the belts, pulleys, bearings, and the like.

In order to solve the problem of motor failure, it might be thought that a wash down duty motor might be used. This type of motor has a housing with means for draining away surface water. For example, such a motor might be used in a car wash where any water falling on the motor runs out a drain in the bottom of a motor housing and does not reach the motor bearings.

While a wash down duty motor is adequate for some uses, it does nothing to solve problems brought about by hostile environments having excessively high humidity, that might, for example, be found in tropical rain forests or certain industrial areas such as mines, paper mills, and the like. In these environments, the atmosphere is near saturation. Thus, the motor should be sealed against entry of substantially any water or moisture, hereinafter called "hermetically sealed", for convenience of expression.

Another reason for a hostile environment is the highly corrosive state of the polymer in a water solution. Depending upon the species (charge) of the polymer, the resulting solution pH can be an acid or base. Therefore, it is also desirable to prevent substantially all corrosive materials from any contact with the internal parts of the motor housing, armature, bearings, etc. Thus, there are other and special reasons why the motor should be hermetically sealed.

Reference is made to my U.S. Pat. No. 5,407,975 for a disclosure of a relatively large system for processing high volumes of dry polymer at relatively high solution concentrations. My patent describes a system for placing the polymer in a more liquid state by bubbling air through the polymer solution. This system has solved most of the practical problems of hydrating or activating dry polymer. However, this patented system is a relatively large one adapted to process very large amounts of polymer. Therefore, it is both too large and too expensive for the small to mid-size user which processes only limited amounts of polymer at any given time. There is no clear boundary between large and small amounts of polymer; however, to give an example for convenience of description, a small scale user might process less than 500 pounds of dry polymer per day while a user of the system described in U.S. Pat. No. 5,407,975 might process more than 10,000 pounds per day.

Hence, the small to mid-size user has a pressing need for a low cost system for processing limited amounts of dense, dry polymer. It is not too important for the low cost system to have all of the features of the large system of my patent as long as the basic hydration or activation of polymer is carried out.

Another important consideration is to provide a small system with almost no maintenance cost. Such a low cost involves a use of as many standard commercial items as possible. For example, specially designed and built hermetically sealed motors would likely escalate the cost of a small system beyond the reach of many small system users.

Accordingly, an object of the invention is to provide a very low cost system for processing limited amounts of coarse, dry polymer.

In keeping with an aspect of the invention, an input to an impeller for the inventive system uses a weir to introduce dry polymer to an electrolyte. The polymer is dropped onto an eye of an impeller which is not hydraulically locked. The impeller completely wets the polymer with a minimum amount of electrolyte, as compared to the larger amounts of water used in the prior art. Once the polymer is suitably wetted, it may be further processed in a fairly conventional manner. The wetting in the inventive device is complete enough to enable the aging step to be carried out by a mixing agitator without requiring the bubbling air used in my prior patent.

In order to reduce the system costs by eliminating special machinery, I have found that it is possible to modify a standard high quality submersible pump to provide the necessary impeller action thereby eliminating the need for special parts without introducing the kind of motor/bearing wear problems which have haunted this kind of system in the past.

A preferred embodiment of the invention is shown in the attached drawings, in which:

FIGS. 1–3 are prior art copied directly from FIGS. 2–4 of my U.S. Pat. No. 5,407,975; and more particularly, showing a schematic disclosure of a dry polymer activating system, and top and side views, respectively, of a funnel for introducing dry polymer to electrolyte;

Figure 1:
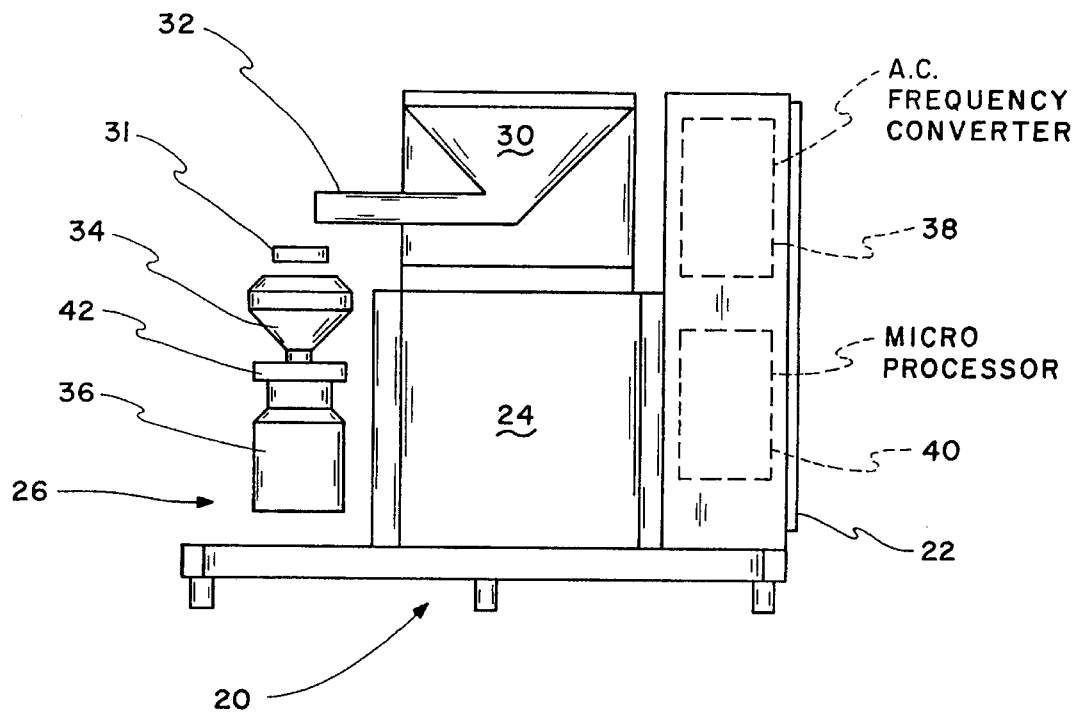

As set forth in U.S. Pat. No. 5,407,975, FIG. 1 shows my prior dry polymer processing system 20 mounted on a single frame. The major components of this system are a control panel 22, a liquid handling section 24, a dry polymer processing system 26, a hopper 30 which is a source of dry polymer, non-contacting sensor 31, a dry polymer output port 32, a mixing container in the form of funnel 34, and a high speed disperser 36. The volumetric feeder at 30 is a standard commercial product. Any suitable shroud (not shown) may be provided to prevent the dry polymers represented by arrows 56 (FIGS. 2 and 3) from being dispersed over any area other than the entrance to the funnel 34.

To assure that dry polymer is flowing into the disperser 36, sensor 31 is located beneath the dry polymer output port 32 in order to "look" for an addition of dry polymer, at the appropriate time. The sensor 31 (FIG. 1) may be a photoelectric cell, a capacitance proximity sensor, or the like.

As shown in FIG. 1, control panel 22 includes a microprocessor 40 and an AC frequency converter 38 which provides a suitable power source for some of the equipment used in the system. The control panel 22 supplies the power required by the microprocessor and associated equipment. The microprocessor 40 operates all of the equipment that is in the system by controlling relays, valves, timing circuits, and the like, as required during the polymer processing.

The liquid handling system 24 receives the solution of dry polymer mixed with water that is the output of section 26. Once the dry polymer is so mixed into a solution, it becomes substantially the same as most liquid polymer which may be introduced into a suitable activating system.

Figure 2:
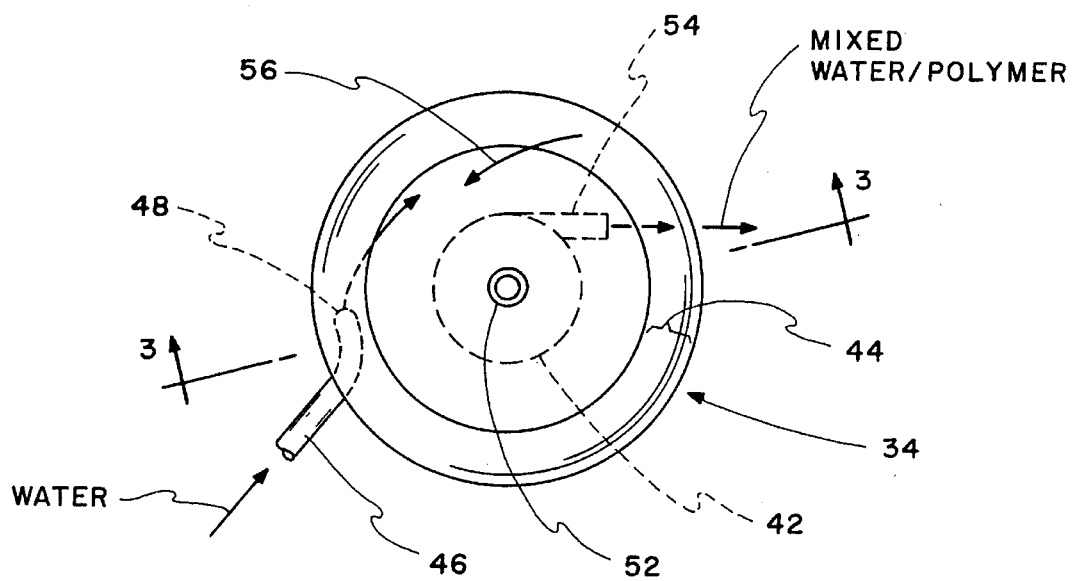
Figure 3:
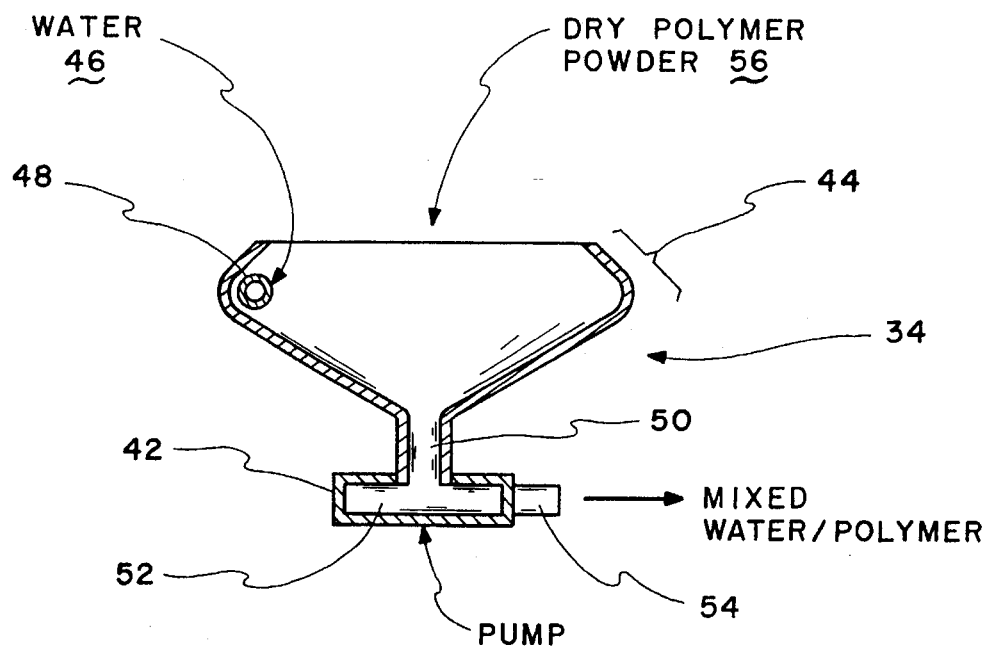

The construction of my prior mixing container or funnel feeder 34 is best shown in FIGS. 2 and 3. If any polymer falls upon a dry spot on the funnel wall, it may form "fish-eyes" or agglomerated particles that are difficult to break up. Therefore, there is a funnel with a turned in upper lip 44. Water is fed in through a somewhat L-shaped pipe 46 having an exit end 48 which dispenses the water circumferentially into an equatorial bulge between the funnel 34 and the upper lip 44. The water swirls around and wets the entire surface of the inside funnel wall and falls under gravity through the funnel spout 50 into the pump impeller. The funnel spout 50 opens directly into the eye or vortex 52 of a centrifugal pump 42.

One type of dry polymer particle flows under gravity from hopper 30 (FIG. 2) through into the eye of the impeller. Any errant dry polymer dust particle falls on a sheet of fast moving water which uniformly wets the entire inside surface of funnel 36, thereby preventing the dry polymer from accumulating at any dry point on the funnel wall. As the water swirls into the vortex 52 of centrifugal pump 42, it receives a large amount of energy which is imparted by the impeller blades. This energy mixes the water and polymer with a uniformity, which is discharged through the output port 54 of pump 42. At this point, the water and polymer mixture becomes approximately the same as a fluid form of polymer.

The dispenser 32 delivers the dry polymer directly into the center of the disperser eye 52 of the centrifugal pump 42. Once in the disperser 36, the dry solid particles are instantaneously wetted while simultaneously being accelerated through the disperser chamber. In order to accomplish this, the disperser eye 52 of pump 42 is not completely immersed in water. The center portion of the spinning impeller element remains visible. That is, the water entering the disperser eye 52 from the funnel wall does not completely cover the impeller due to a combination of a controlled flow of water into the funnel and the centrifugal force imparted to the water by the disperser. Under these operating conditions, the disperser impeller does not become hydraulically locked. Consequently, the dry polymer has a direct pathway to the impeller due to the large amount of entrained air within the disperser 36 chamber.

The more expensive part of the system of FIG. 1 is the mechanical structure described thus far. Also, this structure performs the tasks which are the more difficult to accomplish. Therefore, it is highly desirable to duplicate the more critical of those tasks in a low cost manner, in order to give the low volume user a long sought production tool. Almost always, it is irrelevant to the low volume user whether or not such a low cost system can perform all of the tasks that can be performed by the large volume system described in my U.S. Pat. No. 5,407,975.

Heretofore, three principal problems have formed obstacles to such a low cost system, as follows: (a) the need to have a smooth and unbroken sheet of water on the interior wall of the funnel in order to avoid the fish eyes that occur if dry polymer is inadvertently dropped on a dry spot on the funnel wall; (b) the need to protect the motor beneath the impeller from the coarse and abrasive effects of the dry polymer eating away the bearings and seals which destroys the motor; and (c) the need to accomplish these tasks without requiring high cost specially designed and, therefore, expensive parts.

I have found that the best solution to these problems is provided by a modified submersible pump which is readily available at a relatively low cost. One example of such a submersible pump is sold under the trademark "GRUNDFOS" by the Grundfos Pump Corporation of 2555 Clovis Ave, Clovis, Calif. 93612. The pump body, motor, shaft, and impeller are made of stainless steel with a water lubricated motor which does not require oiling. The entire pump and motor can operate fully immersed without damage. "GRUNDFOS" says that its impeller is designed to resist build-up and to handle sand and solids up to three-eighths of an inch (1.9 cm) deep. "GRUNDFOS" reports that this particular submersible pump may be used to drain small excavations and therefore can withstand the grit, and the like, which is found under water in a newly dug hole in the ground. Of course, there are other standard commercial submersible pumps on the market which can be used according to my invention. Therefore, the appended claims should be construed broadly enough to cover all suitable submersible pumps, and the like.

The usual submersible pump has a suction screen at the bottom to admit water while keeping large objects out of the impeller inside the screen. The motor is above the impeller and is encased in a hermetically sealed chamber with bearings designed and protected to withstand the sand, grit, and other foreign matter. The impeller takes in surrounding water through the suction screen and drives the pumped water up a pipe and out a discharge port on the top of the submersible pump.

Figure 4A:
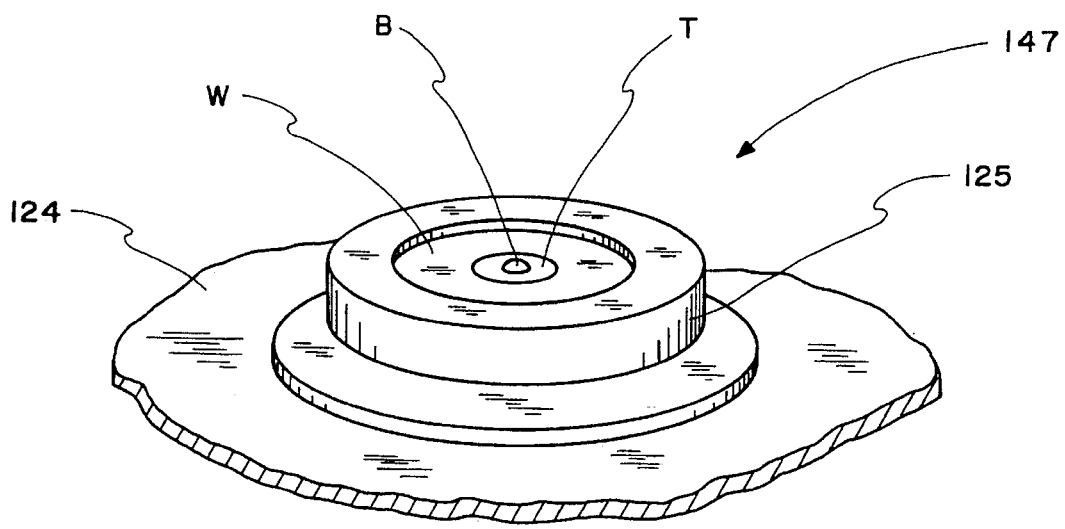
FIG. 4A is a fragmentary view taken from FIG. 4 and showing a level for aligning an upper edge of a weir.
Figure 4:
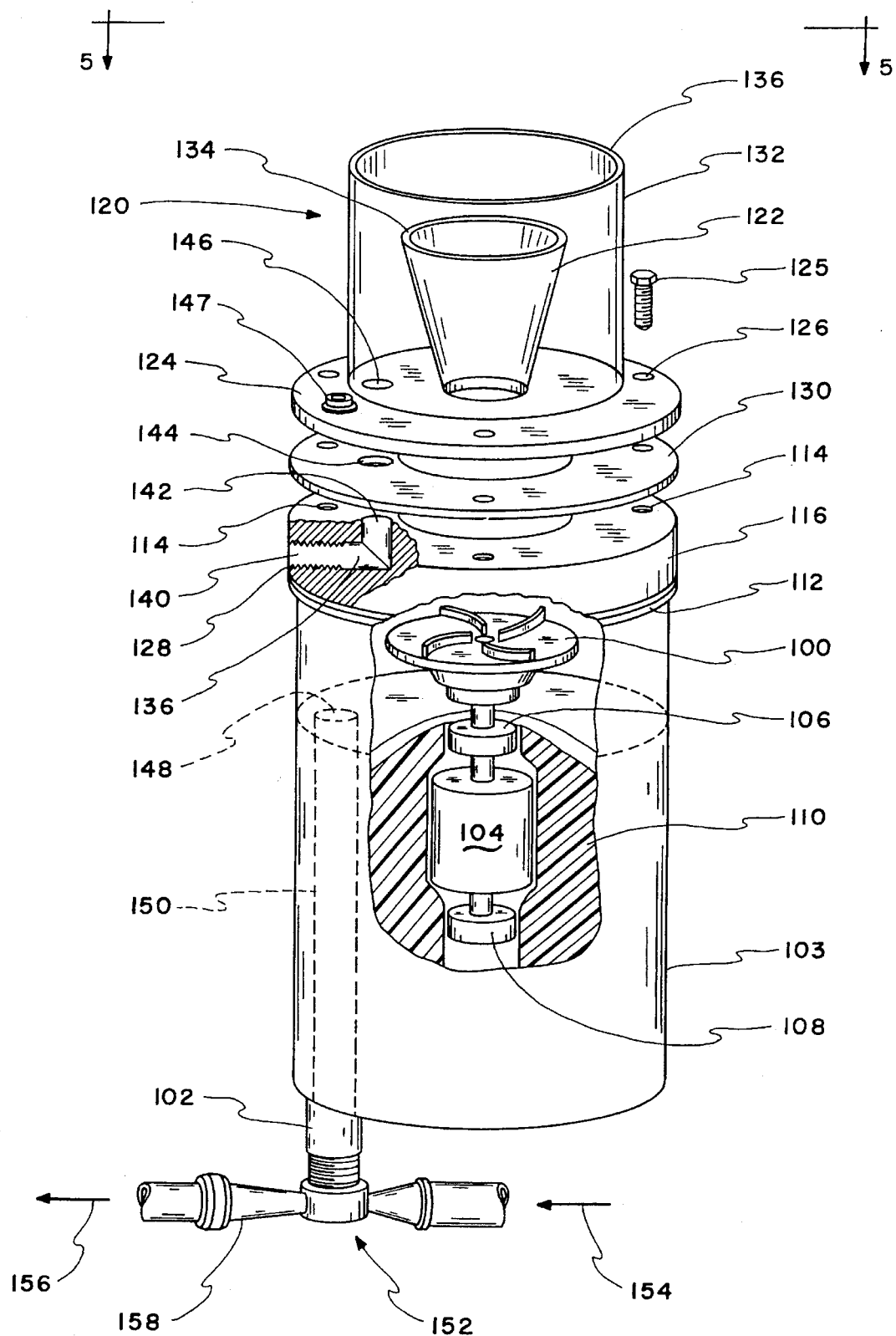
FIG. 4 is a perspective view showing how a quality submersible pump may be modified to convert the system of FIG. 1 into a low cast, low volume system.

FIG. 4 shows the inventive modifications to a submersible pump, here the "GRUNDFOS" submersible pump; however, other submersible pumps may be modified in a similar manner. First, the pump is inverted to place the impeller 100 on top and the discharge pipe 102 on the bottom. The housing 103, motor 104, bearings 106, 108, and hermetic sealing material 110, along with other material structures relating to the water seal, are left untouched.

The suction screen is removed from the submersible pump housing 103, along with the pump volute plate, and discarded leaving the housing with a suitable seat 112 having bolt holes (not seen in FIG. 4) which are provided by the manufacturer for making an attachment of the suction screen to the housing body 103.

A collar 116 is manufactured with bolt holes 114 at locations which are in alignment with the bolt holes in the submersible pump seat 112 that were originally designed to secure the suction screen to the submersible pump housing 103.

A weir 120 is constructed to provide the unbroken curtain of water that coats the inside wall of a funnel 122 which introduces the dry polymer to the eye of impeller 100. In FIG. 4, weir 120 has been drawn as if it is made of a clear and transparent material so that its construction can be seen. In reality, it is preferably constructed of stainless steel, or the like.

In greater detail, the weir has a base plate 124 with bolt holes 126 aligned with the bolt holes 114 in collar 116 and bolt holes on the seat 112 originally provided for attaching the suction screen onto the inverted submersible pump housing 103. Therefore, the collar 116 and base plate 124 may be attached to the submersible pump by passing bolts 125 through these aligned bolt holes. Suitable gaskets 128, 130 respectively seal the collar 116 to the submersible pump seat 112 and the base plate 124 to the collar 116.

Welded or otherwise attached to the top of base plate 124 are an upstanding tubular sleeve 132 and, co-axially therewith, the funnel 122. The top edge 134 of funnel 122 is lower than the top edge 136 of sleeve 132.

An L-shaped passageway is formed in collar 116, leading from a threaded entrance opening 140 to an exit port 142 which is inside the perimeter of the sleeve 132. A suitably placed hole 144 in the gasket 130 seals the output port 142 of the L-shaped passage way 136 to the entrance port 146 inside sleeve 132. Therefore, if water is introduced through threaded opening 140, the water will rise inside sleeve 132 until it reaches the level of the upper funnel edge 134. If the edge is level with respect to gravity, water will spill over edge 134, uniformly surround the periphery and uniformly cover the interior funnel wall. There is no need for special equipment for swirling the water in the funnel bowl. By adjusting the amount of flow of water through opening 140, it is possible to precisely control the weir action.

A level 147 (FIG. 4A) is affixed to the base plate 124. This level is a conventional cylindrical chamber 125 which contains liquid with a bubble B and which has a circular target T imprinted on a transparent top window W. When the bubble B is centered in the target T the upper edge 136 of the funnel is level with respect to gravity.

Figure 5:
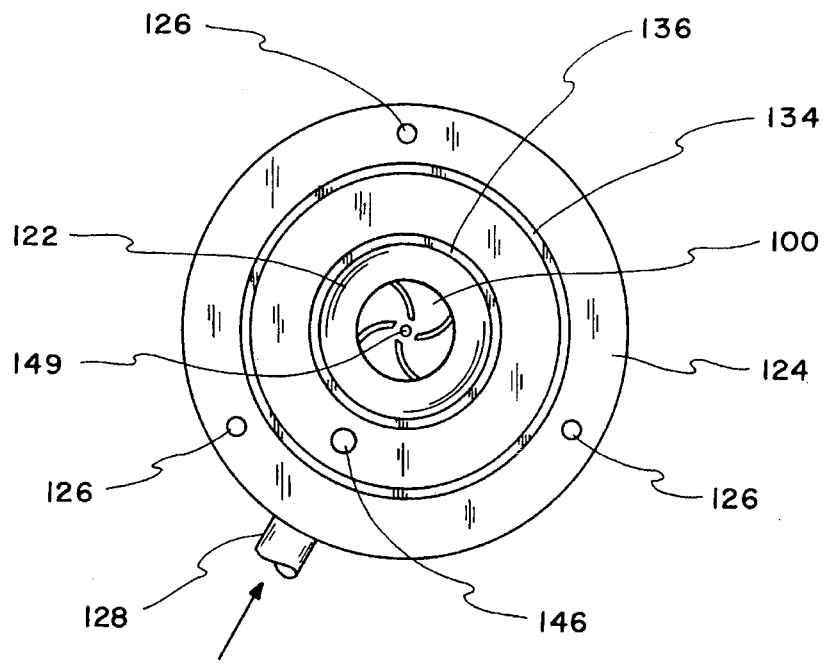
FIG. 5 is a plan view of the invention weir taken along line 5—5 of FIG. 4.

The rate of the inflow of water through hole 146 is adjusted so that the impeller does not become hydraulically locked. That is, the eye 149 (FIG. 5) of the impeller is open to air and is not filled with water. Also, since there is an almost fail safe guarantee of uniform wetting of the inside funnel wall a minimum amount of water is required as compared to the amount of water required by my patented system. This minimization of water consumption both reduces cost and simplifies the procedures by doing away with the need for eliminating the excess water.

The dry polymer is dropped into the eye 149 (FIG. 5) of the impeller 100 where it is uniformly mixed with the water. The mixture is discharged through a port 148 in the impeller chamber and down a discharge pipe 150 to the discharge port 102 at the bottom of the inverted submersible pump.

An eductor 152 is connected to the discharge port 102. The eductor is basically a venturi wherein an inflowing stream 154 of water creates a low venturi pressure that helps pull the processed polymer from the impeller chamber and down pipe 150. The mixture of inflowing water 154 and the processed polymer in pipe 150 is discharged from eductor port 158.

Figure 6:
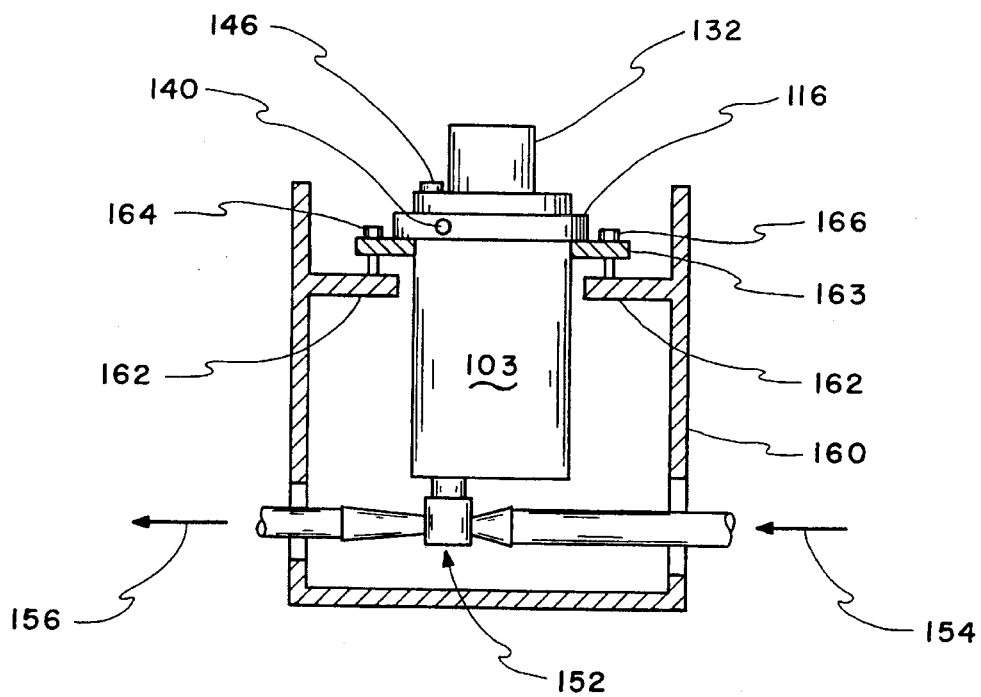
FIG. 6 is a cross-sectional view showing a housing for leveling the weir.

After the discharge from eductor port 158, the processed polymer is further processed by any suitable method. One suitable method might be somewhat as shown in FIG. 6 of my U.S. Pat. No. 5,407,975. One primary difference between the invention and the system of this FIG. 6 is the manner in which the patent eductor 134 is used and the use of an air sparger 136. In the patent, the eductor 134 is connected with the low pressure port drawing off surplus water at the top 44 of the bowl 34. In the present application FIG. 4, the low pressure eductor port is connected to draw the processed polymer from pipe 150. Also in the patent FIG. 6, an air sparger is used to enhance the aging of the high solids processed polymer. In the present invention, there is no need to use an air sparger because the small amounts of polymer do not require special efforts to enhance aging.

The entire submersible pump housing 103 (FIGS. 4 and 5) is preferably enclosed within an outer sleeve or housing 160 (FIG. 6) which protects it from mechanical damage, from contaminants, and presents an attractive appearance. The sleeve or housing 160 preferably includes an inside shelf 162 having a central hole through which the submersible pump housing 103 slips. A support plate 163 having an outside diameter larger than the inside diameter of the hole in the inside shelf 162 is fitted under the collar 116 of the submersible pump. A suitable number of screws (such as 164, 166) extend through holes in support plate 163 and rest upon shelf 162. These screws may be turned to bring the bubble B (FIG. 4A) in level 147 under the target T etched on a window W in the level. When this adjustment is completed, the weir effect produces the desired unbroken curtain of water lining the interior of the funnel.

Of course, other structures may be provided for leveling the weir.

Those who are skilled in the art will readily perceive how to modify the invention. Therefore, the appended claims are to be construed to cover all equivalent structures which fall within the true scope and spirit of the invention.

The claimed invention is:

1. A dry polymer processing system comprising an inverted submersible pump having an impeller at the top of said inverted pump and a discharge at the bottom of said inverted pump, a weir mounted on top of said inverted pump and above said impeller, said weir having a funnel opening leading into an eye of said impeller, means for substantially leveling said weir, and means for depositing dry polymer into said funnel opening.

2. The system of claim 1 wherein said weir comprises an outer sleeve having a first upper edge and a funnel inside said sleeve, said funnel having a second upper edge which is lower than said first upper edge whereby a liquid may raise in said sleeve to a level overflowing said second edge without overflowing said first edge.

3. The system of claim 2 and a collar interposed between said impeller and said weir, said collar including means for introducing said liquid into said outer sleeve, whereby said liquid may rise to an internal height where it overflows said second edge and passes down said funnel.

4. The system of claim 3 wherein said liquid is an electrolyte and a volume of said electrolyte over flowing said second edge is limited to an amount which does not hydraulically lock said impeller.

5. The system of claim 3 and an eductor at a bottom of said discharge, said eductor including a venturi coupled to draw said liquid from said discharge.

6. The system of claim 1 wherein said weir comprises an outer sleeve and an inner funnel mounted coaxially on a base plate, said sleeve having an upper edge which is higher than a top edge of said funnel so that a liquid rising in said sleeve overflows said top edge and into said funnel, means for adjustably mounting said inverted submersible pump in a vertical position, and said means for leveling said weir being a level associated with said weir for assisting a vertical adjustment of said inverted submersible pump in order to insure that said top edge of said funnel is level relative to gravity.

7. The system of claim 6 wherein a pump housing of said inverted submersible pump terminates at its top in a seat having attachment means thereon for attaching a part to said pump housing, said part being not present, said system further comprising a collar having a passageway therein for introducing said liquid into said sleeve, said base plate and said collar having means aligned with said attachment means on said seat so that said base plate and collar are attached to said pump housing in lieu of said part, two gaskets, and means for completing an assembly of said weir on said inverted submersible pump by aligning a first of said gaskets, said collar, a second of said gaskets, and said base plate over said attachment means on said seat, said level being mounted on said base plate and located outside said sleeve.

8. A weir-pump combination for processing polymer, said combination comprising a leakproof housing having a motor at a central location therein, said motor being sealed against substantially any entry of water or moisture, an impeller in a compartment in said housing above said hermetically sealed motor, said impeller being coupled to a shaft on said motor, a drain extending from said compartment through said central location and out a bottom of said housing, a weir on said housing at a location above said impeller, said weir comprising a tubular member opening into an eye of said impeller, an upper edge of said tubular member being substantially level relative to gravity, means for raising a liquid surrounding said tubular member to a height where said liquid overflows said upper edge and passes downwardly along an inner wall of said tubular member, and means for dropping polymer down said tubular member and into said eye of said impeller.

9. The combination of claim 8 and means attached to a bottom of said drain for drawing fluid therefrom.

10. The combination of claim 8 wherein said weir comprises a coaxial pair of tubes with said tubular member being an inner one of said pair of tubes, an outer one of said pair of tubes raising to a height which contains said liquid while it is overflowing said upper edge of said tubular member.

11. The combination of claim 10 wherein said co-axial pair of tubes are mounted on a base plate on said housing, means for introducing said liquid into said outer one of said pair of tubes to raise to said height which overflows said upper edge.

12. The combination of claim 8 and an eductor coupled to the drain at the bottom of said housing for drawing a liquid from said compartment.

13. The combination of claim 8 wherein said tubular member is a funnel, and means above said funnel for dropping a dry polymer through said funnel and into an eye of said impeller.

14. A mechanical assembly for a low volume dry polymer processing system, said assembly comprising an inverted submersible pump having a leakproof housing with an impeller at the top of said inverted pump and a discharge opening at the bottom of said inverted pump, a weir mounted on top of said inverted pump and above said impeller, said weir having an outer sleeve and an inner funnel mounted coaxially on a base plate, means for introducing said liquid into said outer sleeve, said sleeve raising to a height which is higher than a top edge of said funnel so that said liquid rising in said sleeve overflows into said funnel, said funnel having an opening leading into an eye of said impeller, means for substantially leveling said top edge of said funnel, means for depositing dry polymer into said funnel for conveyance into said eye of said impeller, said liquid overflowing said top edge being limited to an amount which does not hydraulically lock said impeller, an eductor coupled to a bottom of said discharge opening, said eductor including a venturi coupled to draw said liquid from said discharge opening, a level associated with said weir for assisting when making a vertical adjustment of said inverted submersible pump to insure that said top edge of said funnel is level relative to gravity, and means for adjusting said vertical position of said inverted submersible pump.

15. The assembly of claim 14 wherein said inverted submersible pump has means therein for attaching a part to a top of said pump, said means for introducing said liquid further comprises means having a passageway for introducing said liquid into said sleeve, said base plate and said passageway means having attachment means aligned with said means for attaching said part, two gaskets, and means for completing said assembly by mounting said weir on said inverted submersible pump by aligning and securing in place said attaching means on said pump, a first of said gaskets, said passageway means, a second of said gaskets, and said base plate.

* * * * *